(12) United States Patent
Hwang et al.

(10) Patent No.: US 6,176,947 B1
(45) Date of Patent: Jan. 23, 2001

(54) LEAD-FREE SOLDERS

(75) Inventors: Jennie S. Hwang, Moreland Hills; Zhenfeng Guo, Solon, both of OH (US)

(73) Assignee: H-Technologies Group, Incorporated, Cleveland, OH (US)

(*) Notice: Under 35 U.S.C. 154(b), the term of this patent shall be extended for 0 days.

(21) Appl. No.: 09/417,169

(22) Filed: Oct. 12, 1999

Related U.S. Application Data

(63) Continuation of application No. 09/224,323, filed on Dec. 31, 1998, now abandoned.

(51) Int. Cl.[7] ........................... C22C 7/00
(52) U.S. Cl. ................ 148/400; 420/560; 420/561
(58) Field of Search ................... 420/560, 561; 148/400

(56) References Cited

U.S. PATENT DOCUMENTS

| | | | |
|---|---|---|---|
| 4,695,428 | 9/1987 | Ballentine et al. | 420/561 |
| 4,879,096 | 11/1989 | Naton | 420/561 |
| 5,328,660 | 7/1994 | Gonya et al. | 420/562 |
| 5,352,407 | 10/1994 | Seelig et al. | 420/561 |
| 5,405,577 | 4/1995 | Seelig et al. | 420/561 |
| 5,520,752 | 5/1996 | Lucey, Jr. et al. | 148/400 |
| 5,527,628 | 6/1996 | Anderson et al. | 428/647 |
| 5,538,686 | 7/1996 | Chen et al. | 420/557 |
| 5,580,520 | 12/1996 | Slattery et al. | 420/557 |

FOREIGN PATENT DOCUMENTS

| | | |
|---|---|---|
| 08132277 A2 | 5/1996 | (JP). |
| 08206874 A2 | 8/1996 | (JP). |
| 09094687 A2 | 4/1997 | (JP). |
| 10193169 A2 | 7/1998 | (JP). |
| 10193171 A2 | 7/1998 | (JP). |
| 10225790 A2 | 8/1998 | (JP). |
| 10314980 A2 | 12/1998 | (JP). |
| WO 9709455 A1 | 3/1997 | (WO). |

*Primary Examiner*—Sikyin Ip
(74) *Attorney, Agent, or Firm*—Fay, Sharpe, Fagan, Minnich & McKee, LLP

(57) ABSTRACT

Disclosed is a high strength, high fatigue resistance, and high wetting lead-free solder alloy comprising effective amounts of tin, copper, silver, bismuth, indium, and antimony and having a melting temperature between 175–215° C.

10 Claims, 1 Drawing Sheet

LEAD-FREE SOLDERS

This application is a continuation in part of U.S. Ser. No. 09/224,323 filed Dec. 31, 1998, now abandoned.

The present invention relates to a lead-free solder alloy for use in soldering and solder interconnections. More particularly, the present invention relates to lead-free compositions containing effective amounts of tin, copper, silver, bismuth, antimony and/or indium and having a melting temperature between 175–215° C. The alloy is particularly useful in microelectronics and electronics applications.

Despite its current success in the electronics industry, Pb—Sn solder alloys face a limited future due to lead toxicity and the control or prohibition of the use of lead on a global landscape. Consequently, many initiatives on a world-wide basis have been taken to find suitable lead-free alternatives to Pb—Sn solder alloys. In the meantime, the high strength and high fatigue resistance of lead-free alloy is needed to meet the increasing level of performance in solder joints as required by the continued advancements in integrated circuit (IC) and IC package technologies.

In the hierarchy of electronics manufacturing, solder alloy is used to metallurgically join the bare chips or packaged chips onto the next level of a substrate through the formation of a desirable band of intermetallics. An instant flow and sound wetting of the solder alloy with the commonly used metallization pads such as Cu, Ag, Au, Pd, Ni and other metallic surfaces is a prerequisite to the formation of reliable solder joints under the high-speed automated manufacturing process using mild fluxes that are acceptable to electronic systems.

Surface mount technology has been a critical manufacturing technology in producing smaller, denser and faster printed circuit boards (PCB) that make modern electronics possible. The Pb—Sn eutectic solder of 63 Sn/37 Pb is most widely used in electronic assembly, particularly surface mount printed circuit boards. This solder provides another critical physical property, i.e., a moderate melting temperature, particularly below 210° C. The melting temperature of an alloy, except a eutectic composition, is often in a range specified by a liquidus and a solidus temperature. An alloy starts to soften at its solidus temperature and completes melting at its liquidus temperature. Soldering must be performed at a temperature above the liquidus temperature of the solder alloy.

A practical soldering process temperature for the surface mount manufacturing environment can be achieved at a temperature around at least 25° C. above the liquidus temperature of the solder alloy, for example, solder alloy having a liquidus temperature of 210° C. should be soldered at 235° C. as a minimum. The melting temperature of solder alloys is critical, because too high of a melting temperature will damage electronic devices and polymer-based PCB during soldering, while too low of a melting temperature will sacrifice the long-term reliability of the solder joints. For circuit board manufacturing involving typical polymer-based PCB such as FR-4, the process temperature cannot practically exceed 240° C. Therefore, a lead-free solder alloy which can replace 63 Sn/37 Pb and function in the surface mount manufacturing process must have a liquidus temperature below 215° C., preferably about 210° C.

Solder joints perform as electrical, thermal, and mechanical interconnections in an electronic system such as telecommunication, computer, avionics and automotive electronics. During the service life, solder joints are inevitably exposed to thermal stresses as the result of temperature fluctuation, power on/off, and/or harsh environmental conditions. This coupled with the mismatching thermal expansion in the interconnected materials of semiconductor, ceramic, metal, and polymer in the system, result in thermo-mechanical fatigue in solder joints. As the electronic circuitry becomes increasingly denser and the clock speed of microprocessors continues to reach ever-higher frequencies, one of the obvious effects on the design of and the material used for an electronic system is to handle the increasing heat dissipation.

In addition, the number of solder joints on each PCB continues to rise. The presence of several thousands or tens of thousands of solder joints on a PCB is not uncommon. However, any single solder joint failure results in a failed system. Consequently, requirements on the strength and fatigue resistance of solder joints are heightened. The recent developments in high pin count integrated circuit (IC) packages such as ball grid array (BGA), chip scale package (CSP), and direct-chip-attach technologies such as flip chip further demand the higher performance in fatigue resistance of solder alloys.

A number of lead-free solders have been proposed in the art. A summary of these lead-free alloys is outlined in Chapter 15 of the book "Modern Solder Technology for Competitive Electronics Manufacturing".

U.S. Pat. No. 5,328,660 to Gonya et al for LEAD-FREE, HIGH TEMPERATURE, TIN BASED, MULTI-COMPONENT SOLDER describes a composition of 78.4 Sn 2 Ag 9.8 Bi 9.8 In. However, the fatigue resistance of this alloy is poor.

U.S. Pat. No. 5,527,628 to Anderson et al for PB-FREE SN—AG—CU TERNARY EUTECTIC SOLDER describes a composition of 93.6 Sn 4.7 Ag 1.7 Cu with the melting temperature of 217° C. The melting temperature of this alloy is still relatively high and its fatigue resistance is moderate.

U.S. Pat. No. 5,520,752 to Lucey et al for COMPOSITE SOLDERS describes a lead-free solder alloy comprising 86 to 97% Sn, 0.3 to 4.5% Ag, 0 to 9.3% Bi and 0 to 5% Cu. The fatigue resistance of the alloy is moderate or low.

U.S. Pat. No. 5,538,686 to Chen et al for ARTICLE COMPRISING a PB-FREE SOLDER HAVING IMPROVED MECHANICAL PROPERTIES describes a lead-free solder alloy with the melting temperatures from 173 to 193° C. comprising >70% Sn, 6 to 10% Zn, 3 to 10% In, <10% Bi, >5% Ag and <5% Cu. The alloys cannot wet typical substrates under electronic packaging and assembly manufacturing environment.

U.S. Pat. No. 5,580,520 to Slattery et al for LEAD-FREE ALLOY CONTAINING TIN, SILVER AND INDIUM describes a composition of 77.2 Sn 2.8 Ag 20 In with the melting temperatures from 179 to 189° C. The fatigue resistance of this alloy is low.

In summary, each of these early lead-free solders fail in at least one area to function adequately in forming reliable solder joints in the electronic packaging and assembly industry.

SUMMARY OF THE INVENTION

Accordingly, it is a primary object of this invention to provide a lead-free solder. It is an advantage of this invention to provide a lead-free solder that offers high-strength, and high fatigue resistance to withstand the increasingly adverse and harsh conditions in microelectronic and electronic applications.

It is a further advantage of this invention to provide a lead-free solder that has a moderate melting temperature range (175–210° C.) useful for mainstream electronics manufacturing.

It is a further advantage of this invention to provide a lead-free solder alloy that can readily wet common metallic substrates such as Sn, Cu, Ag, Au, Pd and Ni in microelectronic and electronic manufacturing to form sound and reliable solder joints without fluxes that are unacceptable to electronic manufacturing.

It is a further advantage of this invention to provide a lead-free solder that can adapt to the established electronic manufacturing process and infrastructure without requiring major changes in materials, processes and components.

Additional objects and advantages of the invention will be set forth in part in the description which follows and in part will be obvious from the description, or may be learned by practice of the invention. The object and advantages of the invention may be realized and attained by means of the instrumentalities and combinations particularly pointed out in the appended claims.

To achieve the foregoing objects and in accordance with the purposes of this invention, as embodied and broadly described herein, the solder alloys of this invention have Sn as a major constituent and effective amounts of Cu, Ag, Bi, In and Sb. The solder demonstrates compatible melting temperature, good wettability, high strength, and high fatigue resistance.

DETAILED DESCRIPTION OF THE INVENTION

Figure 1:
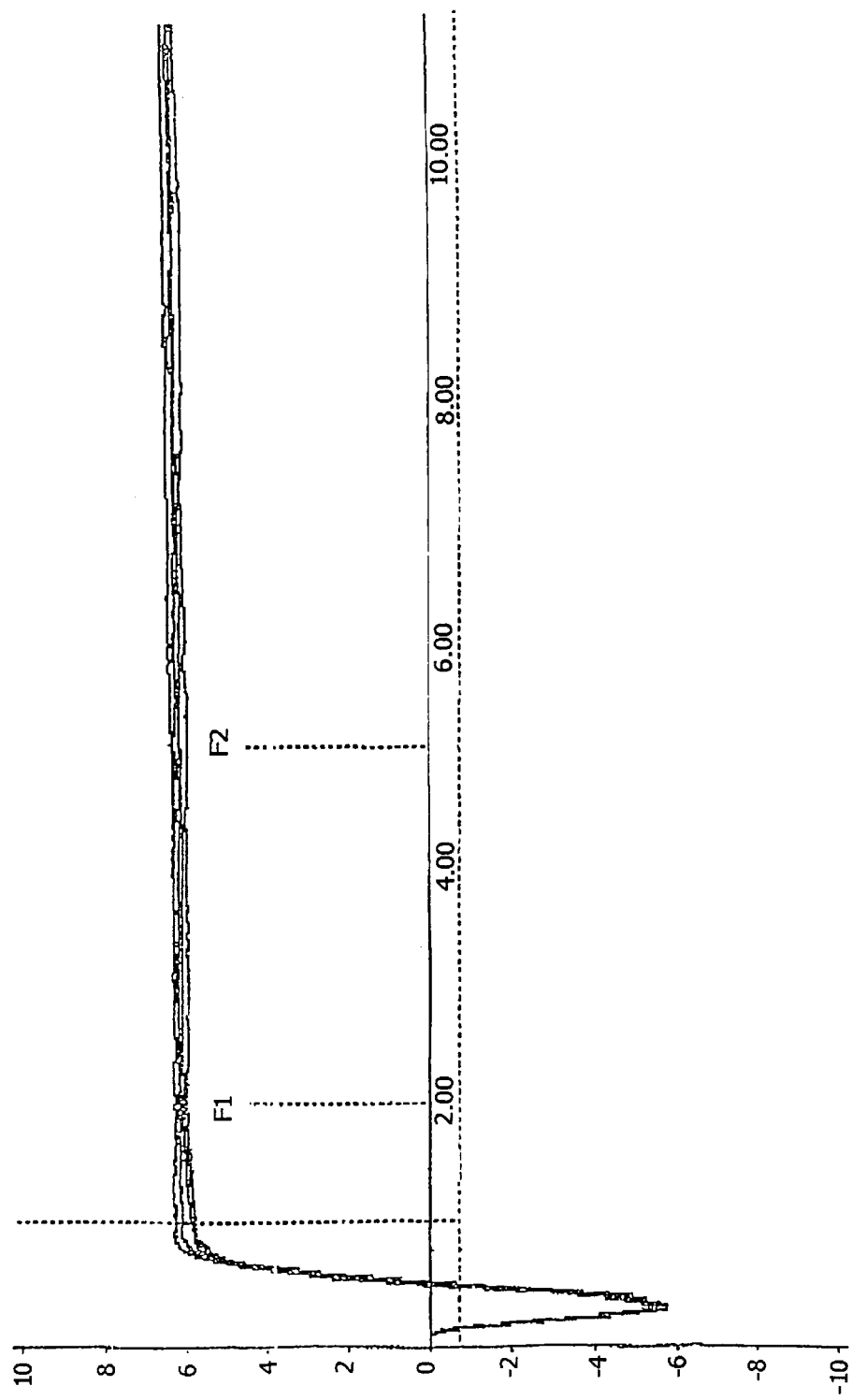
FIG. 1 shows the wetting force (mN) vs. the wetting time of the solder alloy: 82.3 Sn 0.5 Cu 3 Ag 2.2 Bi 12 In on a Cu coupon at 235° C.

While the invention will be described in connection with a preferred embodiment, it will be understood that it is not intended to limit the invention to that embodiment.

The invention provides a high strength, high fatigue resistance, high wetting ability, lead-free solder alloy having the compatible melting temperature with the established printed circuit board manufacturing infrastructure. The solder alloy of this invention comprises about 76 to 96 weight % Sn, 0.2 to 2.5 weight % Cu, 2 to 4.5 weight % Ag, 0 to 12 weight % In, 0 to 5.0 weight % Bi and 0 to 2 weight % Sb. Preferably, the composition will include at least 2.0 weight % In. Preferably, the composition will include at least 0.5 weight % Bi. Preferably, the composition will include greater than 0 weight % Sb. More preferably, greater than 0.01 weight % Sb.

In a particularly preferred form, the invention comprises between about 81 to 93% Sn, 0.2 to 1.0% Cu, 2.5 to 4.5% Ag, and 6 to 12% In. In a further preferred form of the invention, the composition comprises between about 81 to 90% Sn, >0 to 1.0% Cu, 2.5 to 4.5% Ag, 6 to 12% In, and >0% Sb. An alternative embodiment of the invention is the composition comprising 81 to 85% Sn, >0 to 1.0% Cu, 2.5 to 4.5% Ag, 6% to 12% In, and 0.5 to 3.5% Bi. One additional embodiment is the composition comprising 90 to 96% Sn, >0 to 2.5% Cu, 2.0 to 3.5% Ag and 0.5 to 5.0% Bi. Unless otherwise identified in the descriptions and claims, all parts and percentages are by weight.

It is discovered that Cu and Ag combined in proper dosages not only increase the fatigue resistance but also lower the melting temperature. In the preferred forms of the invention, 0.5% Cu alone are the most effective amounts to lower the melting temperatures of alloys. The variations of the melting temperatures of alloys at 0.5–2.5% Cu are within 1° C. Cu at more than 2.5% retards the molten fluidity to cause casting deficiency. For example, the melting temperatures (185–195° C.) of an alloy (83.4 Sn/0.5 Cu/4.1 Ag/12 In) at 0.5% Cu are about 5° C. lower than those (190–200° C.) of an alloy (83.9 Sn/4.1 Ag/12 In) without Cu. The melting temperatures (195–201° C.) of an alloy (87.4 Sn/0.5 Cu/4.1 Ag/8 In) at 0.5% Cu are the same as those (195–201° C.) of an alloy (87 Sn 2 Cu/3 Ag/8 In) at 2% Cu. 0.5% Cu alone are also the most effective amount to enhance fatigue resistance. The plasticity linearly decreases and the fatigue life exponentially decreases with further increasing Cu up to about 2%. For example, the plasticity and fatigue life of an alloy (87.4 Sn/0.5 Cu/4.1 Ag/8 In) at 0.5% Cu are 206% and 146% higher than those of an alloy (86.1 Sn/1.6 Cu/4.3 Ag/8 In) at 1.6% Cu. The plasticity and fatigue life of an alloy (83.4 Sn/0.5 Cu/4.1 Ag/12 In) at 0.5% Cu are 250% and 174% higher than those of an alloy (82.4 Sn/1.5 Cu/4.1 Ag/12 In) at 1.5% Cu.

About 3% Ag alone are the most effective amounts to lower the melting temperatures of alloys. The variations of the melting temperatures of alloys at 3–4.5% Ag are within 1° C. For example, the melting temperatures (196–202° C.) of an alloy (88.5 Sn/0.5 Cu/3 Ag/8 In) at 3% Ag are about 10° C. lower than those (208–212° C.) of an alloy (91.5 Sn/0.5 Cu/8 In) without Ag, but about the same as those (195–201° C.) of an alloy (87.4 Sn/0.5 Cu/4.1 Ag/8 In) at 4.1% Ag.

The additions of In linearly decrease the melting temperatures at a rate of about 1.8° C. per weight percent up to about 12%. The strengths of alloys linearly increase and the fatigue lives exponentially increase with In up to about 8%. 8–10% In are the optimum contents for a superior fatigue resistance. For example, an alloy (87.4 Sn/0.5 Cu/4.1 Ag/8 In) at 8% In has a 6° C. lower melting temperature, 126% higher strength, and 175% higher fatigue life than an alloy (91.4 Sn/0.5 Cu/4.1 Ag/4 In) at 4% In. 12% In is a critical point for the notable occurrence of a softer In second phase at 113° C. For example, an alloy (83.4 Sn/0.5 Cu/4.1 Ag/12 In) at 12% In has a 219% lower fatigue life and 118% lower strength than an alloy (85.4 Sn/0.5 Cu/4.1 Ag/10 In) at 10% In.

The alloys with the relative higher contents (6–12%) of In can be further strengthened by Bi for the lowest possible melting temperatures with an acceptable fatigue resistance for some critical applications. For example, an alloy (82.3 Sn/0.5 Cu/3 Ag/2.2 Bi/12 In) at 12% In and 2.2% Bi has a 130% higher strength and about 2° C. lower melting temperature (183–193° C.) than an alloy (83.4 Sn/0.5 Cu/4.1 Ag/12 In) at 12% In without Bi. The maximum possible content of Bi should be less than 5% for an acceptable plasticity and fatigue resistance. For example, the plasticity and fatigue life of an alloy (79.5 Sn/0.5 Cu/3 Ag/5 Bi/12 In) are significantly degraded to the level that is inferior to those of 63 Sn/37 Pb.

The In-containing solder alloys can also be further strengthened by small amount of Sb, say 0.5%, to achieve higher fatigue resistance without notably raising melting temperatures. For example, an alloy (84 Sn/0.5 Cu/3 Ag/2.2 Bi/12 In/0.5 Sb) at 12% In and 0.5% Sb has a 113% higher strength and 160% higher fatigue life than an alloy (83.4 Sn/0.5 Cu/4.1 Ag/12 In) at 12% In without Sb. However, too high in Sb for the In-containing alloys will increase the melting temperatures, reduce the plasticity and fatigue life, and degrade the wettability on Cu. For example, an alloy (84 Sn/0.5 Cu/3 Ag/12 In/0.5 Sb) at 12% In and 0.5% Sb has a 4° C. lower melting temperature, 212% higher plasticity, and 125 higher fatigue life than an alloy (82.5 Sn/0.5 Cu/3 Ag/12 In/2 Sb) at 2% Sb.

In terms of the underlying mechanisms, Cu, Ag and Sb are all the intermetallics forming metals with Sn. Cu forms $Cu_6Sn_5$ particles, Ag forms $Ag_3Sn$ particles, and Sb forms SnSb cubic particles. Those intermetallic particles themselves are much stronger than Sn-matrix, and are effective blocks for fatigue crack propagation. Indirectly, the formation of the multi-intermetallic particles partitions a finer Sn-matrix grain structure. The intermetallics-induced finer grains in Sn-matrix facilitate grain boundary gliding and extend fatigue lifetime.

In enter Sn-matrix crystal lattice as substitutional solute atoms. The In-solute gives solid solution strengthening, and promotes a finer slip character for a higher fatigue fracture capacity.

Bi enters Sn-matrix crystal lattice as substitutional solute atoms up to about 1 wt. %. Beyond about 1 wt. %, Bi can precipitate out as second phase particles. Therefore, Bi provides both solid solution strengthening and precipitation strengthening. The portion of Bi-solute strengthening should also promote a finer slip character for a higher fatigue fracture capacity in Sn-matrix.

The content of 2.5–3.5% Ag is critical for solder alloys in Sn/Cu/Ag/Bi system in contrast to 2.5–4.5% Ag for any other systems containing In. A content of Ag beyond 3.5 in Sn/Cu/Ag/Bi system induces alloy brittleness. For example, the fatigue life and plasticity of an alloy (93.3 Sn/0.5 Cu/3.1 Ag/3.1 Bi) at 3.1% Ag are about 152% and 138% higher than an alloy (90.5 Sn/1.7 Cu/4.7 Ag/3.1 Bi) at 4.7% Ag. The content of 2.5% Ag is a minimum to provide a superior fatigue resistance. Below 2.5%, the fatigue resistance is lowered. For example, the fatigue lives of alloys 93.3 Sn/0.5 Cu/3.1 Ag/3.1 Bi, and 92.2 Sn/1.5 Cu/3.2 Ag/3.1 Bi and 91.5 Sn/2 Cu/3.4 Ag/3.1 Bi are about 538%, 366% and 281% higher than that of an alloy (93 Sn/2 Cu/2 Ag/3 Bi) at 2% Ag.

However, in any other systems containing In, In will react with Ag or absorb some Ag to form $AgIn_2$ intermetallic compound or even AgSnIn ternary intermetallic. Therefore, the maximum content of Ag in any other systems containing In can be allowed to be 4.5% for the good plasticity and fatigue life. Any higher dosage will not further reduce the melting temperature but will increase brittleness. For example, at the same melting temperature, the plasticity of an alloy (84 Sn/0.5 Cu/13 Ag/12/0.5 Sb) is 131% higher than an alloy (81.1 Sn/1.7 Cu/4.7 Ag/12 In/0.5 Sb).

For reference purposes, it is believed that the melting temperature of 63 Sn/37 Pb solder was measured at about 183° C., the ultimate tensile strength being 47 MPa and the low-cycle fatigue life at 0.2% strain being 3650 cycles. The melting temperature, tensile strength and fatigue life of known solder alloy 99.3 Sn 0.7 Cu are 227° C., 24 MPa and 1125 cycles, respectively. The melting temperature, tensile strength, and fatigue life of known solder alloy 96.5 Sn 3.5 Ag are 221° C., 35 MPa and 4186 cycles, respectively.

The present inventive solder alloy demonstrates a tensile strength of at least 50 MPa, preferably 60 MPa; a low-cycle fatigue life at 0.2% strain of at least about 5,000 cycles, preferably about 10,000; a solidus melting temperature of between about 175 and 215° C., preferably less than 210° C.; and a liquidus melting temperature of between about 185 and 215° C., preferably less than 210° C.

In a preferred embodiment of the invention, there is provided a solder alloy containing about 87.4% Sn, 0.5% Cu, 4.1% Ag and 8% In. The alloy has a melting temperature from about 195° C. to 201° C. The tensile strength and fatigue life of the alloy are 63 MPa and 17152 cycles, respectively. The fatigue life of this invention is 470% higher than that of 63 Sn/37 Pb, and the tensile strength is 134% higher than that of 63 Sn/37 Pb.

In one preferred embodiment of the invention, there is provided a solder alloy containing about 85.4% Sn, 0.5% Cu, 4.1% Ag and 10% In. The alloy has melting temperatures from about 194° C. to 199° C. The tensile strength and fatigue life of the alloy are 66 MPa and 17378 cycles, respectively. The fatigue life of this invention is 476% higher than that of 63 Sn 37 Pb, and the tensile strength is 140% higher than that of 63 Sn/37 Pb.

In another preferred embodiment of the invention, there is provided a solder alloy containing about 84% Sn, 0.5% Cu, 3% Ag, 0.5% Sb and 12% In. The alloy has melting temperatures from about 186° C. to 196° C. The tensile strength and fatigue life of the alloy are 58 MPa and 12345 cycles, respectively. The fatigue life of this invention is 338% higher than that of 63 Sn 37 Pb, and the tensile strength is 123% higher than that of 63 Sn/37 Pb.

In another preferred embodiment of the invention, there is provided a solder alloy containing about 82.3% Sn, 0.5% Cu, 3% Ag, 2.2% Bi and 12% In. The alloy has melting temperatures from about 183° C. to 193° C. The tensile strength and fatigue life of the alloy are 77 MPa and 8722 cycles, respectively. The fatigue life of this invention is 239% higher than that of 63 Sn 37 Pb, and the tensile strength is 164% higher than that of 63 Sn/37 Pb.

In another preferred embodiment of the invention, there is provided a solder alloy containing about 92% Sn, 2% Cu, 3% Ag and 3% Bi. The alloy has melting temperatures from about 209° C. to 212° C. The tensile strength and fatigue life of the alloy are 89 MPa and 8135 cycles, respectively. The fatigue life of this invention is 223% higher than that of 63 Sn 37 Pb, and the tensile strength is 189% higher than that of 63 Sn/37 Pb.

In another preferred embodiment of the invention, there is provided a solder alloy containing about 83.4% Sn, 0.5% Cu, 4.1% Ag and 12% In. The alloy has a melting temperature from about 185° C. to 195° C., and the tensile strength and fatigue life of the alloy are 56 MPa and 7,950 cycles, respectively. The fatigue life of this invention is 218% higher than that of 63 Sn 37 Pb, and the tensile strength is 119% higher than that of 63 Sn/37 Pb.

Instant flow and sound bonding occurred in each of the above embodiments as evidenced by wetting balance tests (FIG. 1), surpassing the requirements in wetting ability in reference to the industry standards, such as American National Standard Institute, ANSI-STD-002 and ANSI-STD-003. The wetting flux was a non-activated rosin or a mildly activated rosin or a no-clean flux.

Wetting ability in reference with ANSI-STD-002 and ANSI-STD-003, wetting force at 2.0 second (F1) and at 5.0 second (F2) shall exceed 4.809 mN and wetting time ($t_{2/3}$) to reach ⅔ maximum wetting force shall be no more than 1.0 second. Area of dewetting shall be less than 5%. As an example shown in FIG. 1, the solder alloy of this invention composition 82.3% Sn 0.5% Cu 3% Ag 2.2% Bi 12% In demonstrated F1=5.98mN F2=6.10mN $t_{2/3}$=0.72 second dewetting=0%

The above lead-free solder alloys of this invention can be prepared at the molten states of the major constituents by general heating techniques known in the art. The alloys can also be used in various physical forms such as pastes, powders, bars and wires or in any soldering processes such as reflow oven soldering, wave machine soldering and hand soldering or in any materials fabrication such as various deposition and coating techniques.

While the invention has been described with respect to its preferred embodiments, it is to be understood that variations and modifications thereof will become apparent to those skilled in the art. The foregoing disclosure is not intended or to be construed to limit the scope of the invention hereby.

We claim:

1. A lead-free solder alloy consisting essentially of 76% to 96% Sn, 0.2% to 2.5% Cu, 2.5% to 4.5% Ag and 6% to 12% In having a liquidus melting temperature below about 215° C.

2. The lead-free solder alloy of claim 1 including up to 8% In.

3. The lead-free solder alloy of claim 1 consisting of 76% to 96% Sn, 0.2% to 1.0% Cu, 2.5% to 4.5% Ag and 6% to 12% In.

4. The lead-free solder alloy of claim 1, wherein the solder alloy composition consists of about 87.4% Sn, 0.5% Cu, 4.1% Ag and 8% In.

5. The lead-free solder alloy of claim 1, wherein the solder alloy composition consists of about 85.4% Sn, 0.5% Cu, 4.1% Ag and 10% In.

6. The lead-free solder alloy of claim 1, wherein the solder alloy composition consists of about 83.4% Sn, 0.5% Cu, 4.1% Ag and 12% In.

7. A lead-free solder alloy consisting essentially of 76% to 96% Sn, 0.2% to 2.5% Cu, 2.5% to 4.5% Ag, 6% to 12% In, and >0% to 2% Sb.

8. A lead-free solder alloy consisting essentially of 76% to 96% Sn, 0.2% to 2.5% Cu, 2.5% to 4.5% Ag, 6% to 12% In, and 0.5% to 5.0% Bi having a liquidus melting temperature below about 215° C.

9. A lead-free solder alloy consisting essentially of 76% to 96% Sn, 0.2% to 2.5% Cu, 2.5% to 4.5% Ag, 6% to 12% In, 0.5% to 5.0% Bi and >0% to 2% Sb.

10. A lead-free solder alloy consisting essentially of 76% to 96% Sn, 0.2% to 2.5% Cu, 2.5% to 3.5% Ag, and 0.5% to 5.0% Bi.

* * * * *